(12) United States Patent
Africa et al.

(10) Patent No.: US 10,958,739 B2
(45) Date of Patent: *Mar. 23, 2021

(54) CAPTURING A VIRTUAL CONFIGURATION FROM CLOUD-PROVISIONING DATA

(71) Applicant: International Business Machines Corporation, Armonk, NY (US)

(72) Inventors: George Africa, Sydney (AU); Jianwen Chen, Oatley (AU); Michael A. Shallcross, Cronulla (AU); Hsiao C. Thio, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,358

(22) Filed: Aug. 30, 2019

(65) Prior Publication Data
US 2019/0387064 A1 Dec. 19, 2019

Related U.S. Application Data

(63) Continuation of application No. 16/241,137, filed on Jan. 7, 2019, now abandoned, which is a continuation
(Continued)

(51) Int. Cl.
*H04L 29/08* (2006.01)
*H04L 12/24* (2006.01)

(52) U.S. Cl.
CPC .............. *H04L 67/16* (2013.01); *H04L 41/08* (2013.01); *H04L 41/082* (2013.01);
(Continued)

(58) Field of Classification Search
CPC . H04L 41/08–082; H04L 41/085–0863; H04L 41/5041–5058; H04L 67/10;
(Continued)

(56) References Cited

U.S. PATENT DOCUMENTS 8,612,574 B2  12/2013  Akiyama
8,639,798 B2   1/2014  Akiyama
(Continued)

OTHER PUBLICATIONS

Knittl et al., Towards a Configuration Management System for hybrid cloud deployments, Retrieved from Internet Jun. 16, 2016, 2 pages.
(Continued)

*Primary Examiner* — Brendan Y Higa
(74) *Attorney, Agent, or Firm* — Schmeiser, Olsen & Watts; Nicholas L. Cadmus

(57) ABSTRACT

A method and associated systems for capturing configuration items from hybrid-cloud provisioning data. A processor of a service-management system intercepts a service request requesting that the hybrid cloud's orchestration mechanism provision or deprovision a configuration item of the hybrid cloud. The service-management system identifies the configuration item by examining the service request and then forwards the request to the cloud-orchestration mechanism. After confirming that the request has been satisfied, the service-management system retrieves from the orchestration mechanism provisioning information that describes attributes of the newly provisioned or deprovisioned configuration item and uses this information to update a configuration-management database, marking any provisioning information newly stored in the database as being authorized for use by other management systems of the hybrid cloud. The service-management system then enhances the stored data by means of an artificially intelligent analytics module and additional configuration-item data collected by a discovery agent.

20 Claims, 5 Drawing Sheets

Related U.S. Application Data of application No. 15/358,478, filed on Nov. 22, 2016, now Pat. No. 10,257,289.

(52) U.S. Cl.
CPC ........ *H04L 41/085* (2013.01); *H04L 41/0806* (2013.01); *H04L 41/0853* (2013.01); *H04L 41/0856* (2013.01); *H04L 41/0873* (2013.01); *H04L 41/0886* (2013.01); *H04L 41/0893* (2013.01); *H04L 67/1097* (2013.01); *H04L 41/5096* (2013.01); *H04L 67/10* (2013.01)

(58) Field of Classification Search
CPC ............. H04L 67/1048; H04L 67/1097; H04L 67/14–142; H04L 67/16; H04L 67/34
See application file for complete search history.

(56) References Cited

U.S. PATENT DOCUMENTS

| | | |
|---|---|---|
| 9,444,685 B2 | 9/2016 | Mishra et al. |
| 9,851,986 B2 | 12/2017 | Chen et al. |
| 2008/0209005 A1 | 8/2008 | Akamatsu |
| 2009/0106459 A1 | 4/2009 | Abels |
| 2010/0275203 A1* | 10/2010 | Shinohara ............ G06F 9/45558 718/1 |
| 2012/0204187 A1 | 8/2012 | Breiter |
| 2014/0013099 A1 | 1/2014 | Sekiguchi |
| 2015/0222694 A1 | 8/2015 | Pandey |
| 2016/0080204 A1 | 3/2016 | Mishra |
| 2016/0142262 A1 | 5/2016 | Werner |
| 2018/0146049 A1 | 5/2018 | Africa |
| 2018/0300041 A1 | 10/2018 | Tilikin |
| 2019/0141144 A1 | 5/2019 | Africa |
| 2019/0207812 A1 | 7/2019 | Li et al. |

OTHER PUBLICATIONS

Labriola, Donald J.; List of IBM Patents or Patent Applications Treated as Related; 1 page.

Perera, Automatic Configuration Management: Autodiscovery of Configuration Items and Automatic Configuration Verification, SpaceOps Conferences, May 16-20, 2016, Daejeon, Korea, SpaceOps 2016 Conference, 13 pages.

* cited by examiner

CAPTURING A VIRTUAL CONFIGURATION FROM CLOUD-PROVISIONING DATA

CROSS REFERENCE TO RELATED APPLICATIONS

This application is a continuation application claiming priority to Ser. No. 16/241,137 filed Jan. 7, 2019 which is a continuation application claiming priority to Ser. No. 15/358,478, filed Nov. 22, 2016, now U.S. Pat. No. 10,257,289 issued Apr. 9, 2019, the contents of which are hereby incorporated by reference.

BACKGROUND

The present invention relates to provisioning virtual resources in a cloud-computing environment and, in particular, to capturing information describing configuration items (CIs) required in order to manage a hybrid cloud-computing environment.

A hybrid cloud is a type of computing infrastructure that includes one or more "private" cloud or non-cloud environments under control of a user, and at least one "public" cloud-computing environment managed by a third party, such as a commercial broker of cloud-based services. These public and private zones of a hybrid cloud are distinct entities, but are coupled closely enough to enable multiple deployment models.

For example, a hybrid cloud might include a set of virtualized PaaS (Platform as a Service) services provisioned on a public cloud. In this case, provisioning these PaaS services on a public cloud might make those services more readily available to applications residing in other zones of the hybrid cloud, such as a private cloud or a private non-cloud enterprise data center.

Managing hybrid-cloud resources can be complex, and this is especially true when a hybrid cloud comprises non-virtualized domains. In such cases, change-management or service-management tasks may be at least partly handled by a dedicated service-management system (or "SMS") that tracks, manages, and controls configuration items ("CIs"). As the term is used here, a CI may be any entity of the hybrid cloud that must be managed and controlled in order to deliver a service. These entities may, for example, be comprise virtual machines, applications, infrastructure components, specific instances of software objects, configuration settings, middleware, networks, or a service itself.

In some embodiments, each CI may be identified by a unique name and a set of specific attributes, allowing an SMS to manage the CI as a self-contained unit throughout its lifecycle. This CI information may be stored or modeled in a configuration-management database ("CMDB") that stores attribute data about each CI and about relationships between CIs. This attribute data may, for example, comprise a combination of software-configuration settings, hardware specifications, or application requirements. Stored relationships between CIs may, for example, comprise a dependency relationship that requires two types of virtual machine to be provisioned in a certain order, or a relationship between a software application and an infrastructure component on which the application is installed.

Existing service-management systems generally use an automated discovery agent (or agentless tool) to collect CI information from service-management end points, such as network-management systems, infrastructure components, or network nodes. This discovered CI information is then stored in a CMDB for ongoing reference.

Data collected in this way, however, is not automatically validated as being accurate and current enough to be used reliably for configuration-management, billing-management, event-management, or other purposes by authorized IT-management systems like an SMS or a change-management system. Therefore, stored CI data must be validated or "promoted" to an authorized status, often by consolidating the stored CI data with other change-management data. In some cases, only validated CI information stored in a configuration-management database may be used by an authorized user or management system.

Because discovery entails examining every configuration item of every network of a hybrid cloud, using a discovery mechanism to populate a CMDB can be time-consuming and resource-intensive. In addition, a discovery tool must be initialized with details of the managed cloud environment in order to access every CI, such as a model of each cloud's network topology or privacy and security constraints that may restrict access to certain CIs.

It can also be difficult for a discovery tool to ensure that it is accurately tracking current states of every CI if a cloud is known to frequently provision and deprovision virtual resources. In such cases, by the time a discovery agent has finished traversing a large network, some virtualized CIs may have been added, deleted, or reconfigured by a cloud-orchestration mechanism or other provisioning function, thus rendering at least part of the discovered information obsolete before it can be reported.

Furthermore, although discovery agents can discover CIs known to a particular user's cloud-computing environment, they may not be able to identify changes made by a cloud-service provider without the user's knowledge. This may make it impossible to consolidate certain CIs with change-management data used by the cloud provider. In such cases, CI data may be known to a cloud's cloud-orchestration mechanism because that data is needed to perform operations like provisioning virtualized resources. However, existing CI discovery agents generally have no way to access that information.

There is thus a need for a method of capturing CI data and populating a CMDB that does not require brute-force automated discovery and there is a particular need for a way to access and consolidate existing configuration-item provisioning information that may already be known to a cloud-orchestration mechanism.

BRIEF SUMMARY

An embodiment of the present invention provides a service-management system of a hybrid cloud comprising a processor, a memory coupled to the processor, and a computer-readable hardware storage device coupled to the processor, the storage device containing program code configured to be run by the processor via the memory to implement a method for capturing configuration items from hybrid-cloud provisioning data, the method comprising:

intercepting a service request directed to a cloud-orchestration mechanism of the hybrid cloud, where the service request is capable of requesting that the cloud-orchestration mechanism provision or deprovision a virtualized configuration item of the hybrid cloud;

extracting from the service request an identification of a request to provision a first configuration item of the hybrid cloud;

forwarding the service request to the cloud-orchestration mechanism;

determining that the cloud-orchestration mechanism has provisioned the first configuration item;

capturing provisioning information from the cloud-orchestration mechanism, where the captured provisioning information describes one or more attributes of the first configuration item; and updating a configuration-management database with the captured provisioning information, where data stored in the configuration-management database identifies attributes of one or more configuration items of the hybrid cloud.

Another embodiment of the present invention provides method for capturing configuration items from hybrid-cloud provisioning data, the method comprising:

intercepting a service request directed to a cloud-orchestration mechanism of a hybrid cloud, where the service request is capable of requesting that the cloud-orchestration mechanism provision or deprovision a virtualized configuration item of the hybrid cloud;

extracting from the service request an identification of a request to provision a first configuration item of the hybrid cloud;

forwarding the service request to the cloud-orchestration mechanism;

determining that the cloud-orchestration mechanism has provisioned the first configuration item;

capturing provisioning information from the cloud-orchestration mechanism, where the captured provisioning information describes one or more attributes of the first configuration item; and updating a configuration-management database with the captured provisioning information, where data stored in the configuration-management database identifies attributes of one or more configuration items of the hybrid cloud.

Yet another embodiment of the present invention provides a computer program product, comprising a computer-readable hardware storage device having a computer-readable program code stored therein, the program code configured to be executed by a service-management system comprising a processor, a memory coupled to the processor, and a computer-readable hardware storage device coupled to the processor, the storage device containing program code configured to be run by the processor via the memory to implement a method for capturing configuration items from hybrid-cloud provisioning data, the method for capturing configuration items from hybrid-cloud provisioning data, the method comprising:

intercepting a service request directed to a cloud-orchestration mechanism of a hybrid cloud, where the service request is capable of requesting that the cloud-orchestration mechanism provision or deprovision a virtualized configuration item of the hybrid cloud;

extracting from the service request an identification of a request to provision a first configuration item of the hybrid cloud;

forwarding the service request to the cloud-orchestration mechanism;

determining that the cloud-orchestration mechanism has provisioned the first configuration item;

capturing provisioning information from the cloud-orchestration mechanism, where the captured provisioning information describes one or more attributes of the first configuration item; and updating a configuration-management database with the captured provisioning information, where data stored in the configuration-management database identifies attributes of one or more configuration items of the hybrid cloud.

DETAILED DESCRIPTION

Figure 1:
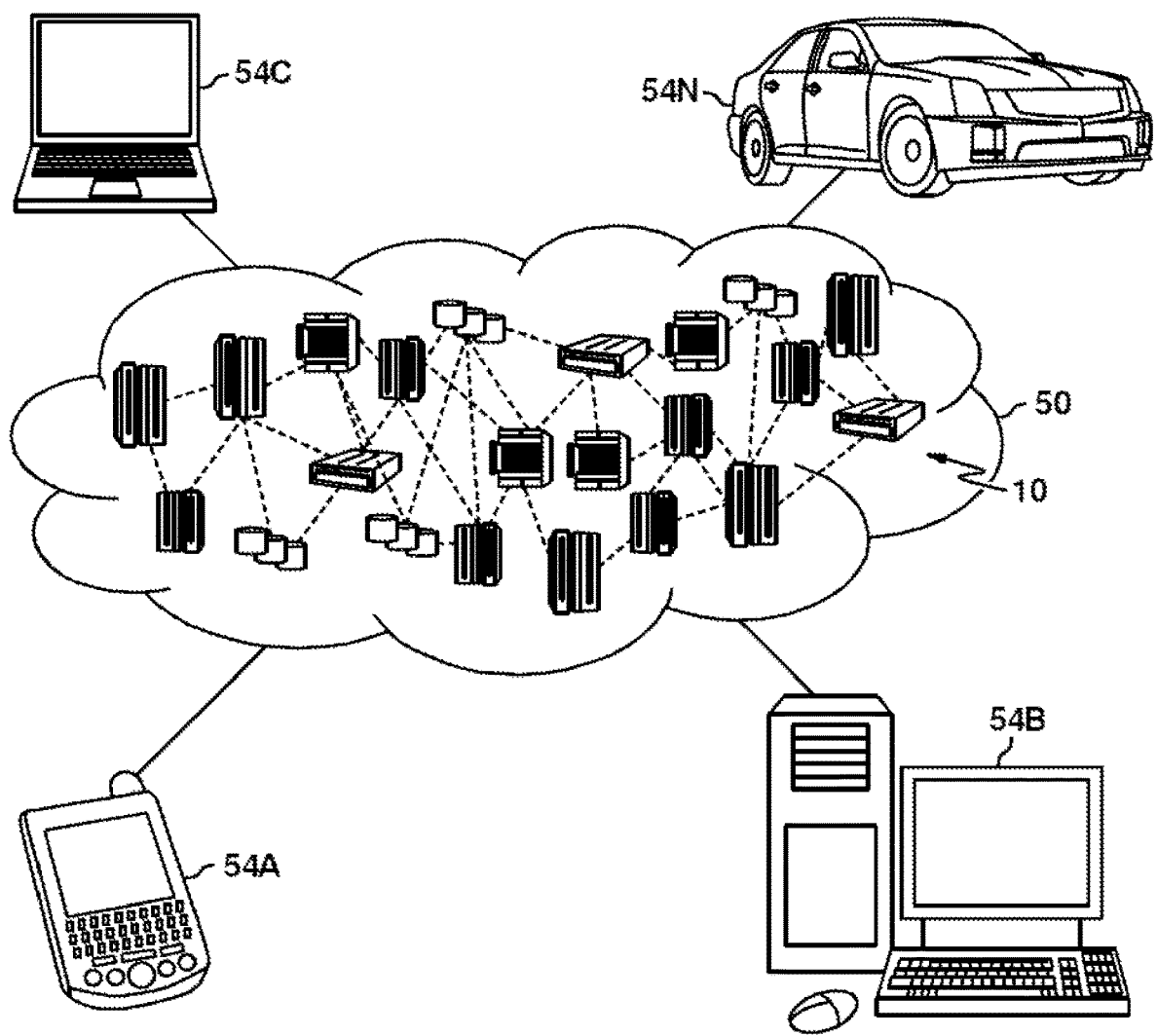
FIG. 1 depicts a cloud computing environment according to an embodiment of the present invention.

The present invention comprises systems and associated methods for capturing identifying information of configuration items (CIs) in cloud-computing environment like a hybrid cloud that comprises both public clouds and private clouds. Rather than using a conventional discovery mechanism, such as a discovery agent that crawls an entire network infrastructure to identify CI information accessible to a cloud-service user, the present invention captures this information from provisioning data used by a cloud-orchestration facility of the cloud's management platform.

This document uses the term "Service Management" to describe strategic approaches to designing, delivering, managing, and improving ways in which information technology is used to provide services or resources within an organization. Service-management systems seek to manage people, processes, and technology to best ensure that an organization can meet its business goals.

"Configuration management" describes any systems-engineering process intended to ensure that a product's performance, functionality, and physical attributes remain consistent with those identified by the product's requirements, design, and operational parameters throughout the product's lifecycle.

A configuration item (or "CI") is any component of an IT Infrastructure that is subject to formal change control by a configuration-management application or process. Configuration items may in some cases include documentary items, such as a service customer's service-level agreement or a Request for Change document.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
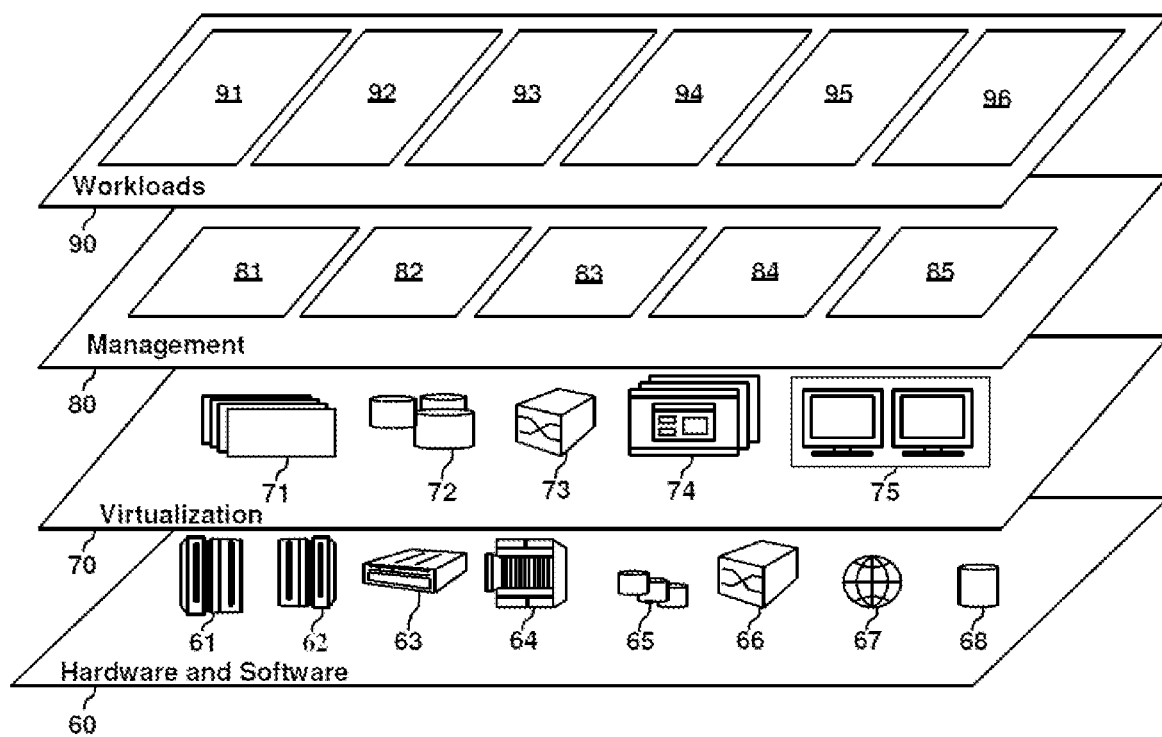
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestrating the capture of information describing Configuration Items of a hybrid cloud-computing network.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
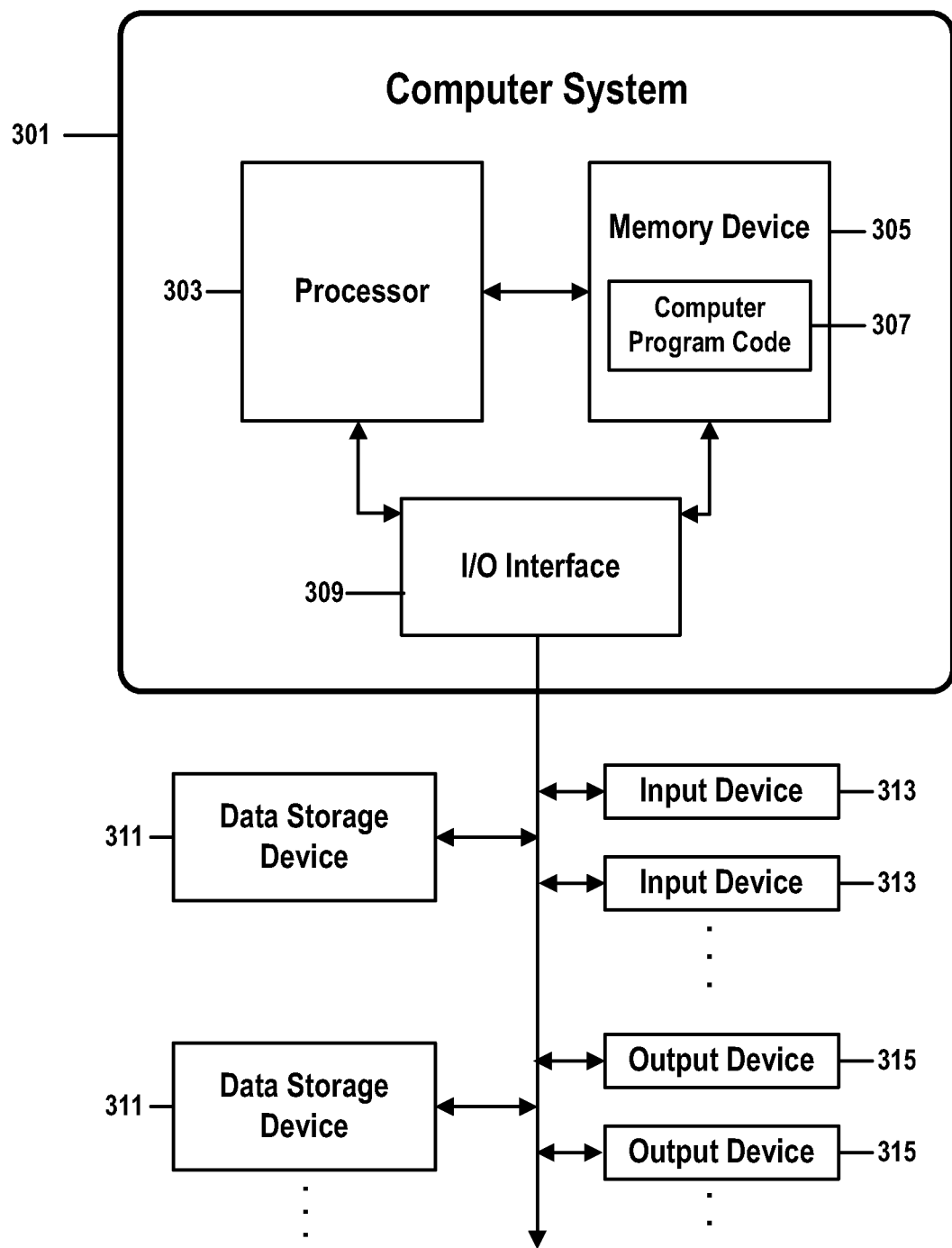
FIG. 3 shows the structure of a computer system and computer program code that may be used to implement a method for capturing configuration items from hybrid-cloud provisioning data in accordance with embodiments of the present invention.

FIG. 3 shows a structure of a computer system and computer program code that may be used to implement a method for capturing configuration items from hybrid-cloud provisioning data in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for capturing configuration items from hybrid-cloud provisioning data in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for capturing configuration items from hybrid-cloud provisioning data.

Any of the components of the present invention could be created, integrated, hosted, maintained, deployed, managed, serviced, supported, etc. by a service provider who offers to facilitate a method for capturing configuration items from hybrid-cloud provisioning data. Thus the present invention discloses a process for deploying or integrating computing infrastructure, comprising integrating computer-readable code into the computer system 301, wherein the code in combination with the computer system 301 is capable of performing a method for capturing configuration items from hybrid-cloud provisioning data.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

While it is understood that program code 307 for a method for capturing configuration items from hybrid-cloud provisioning data may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for capturing configuration items from hybrid-cloud provisioning data is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
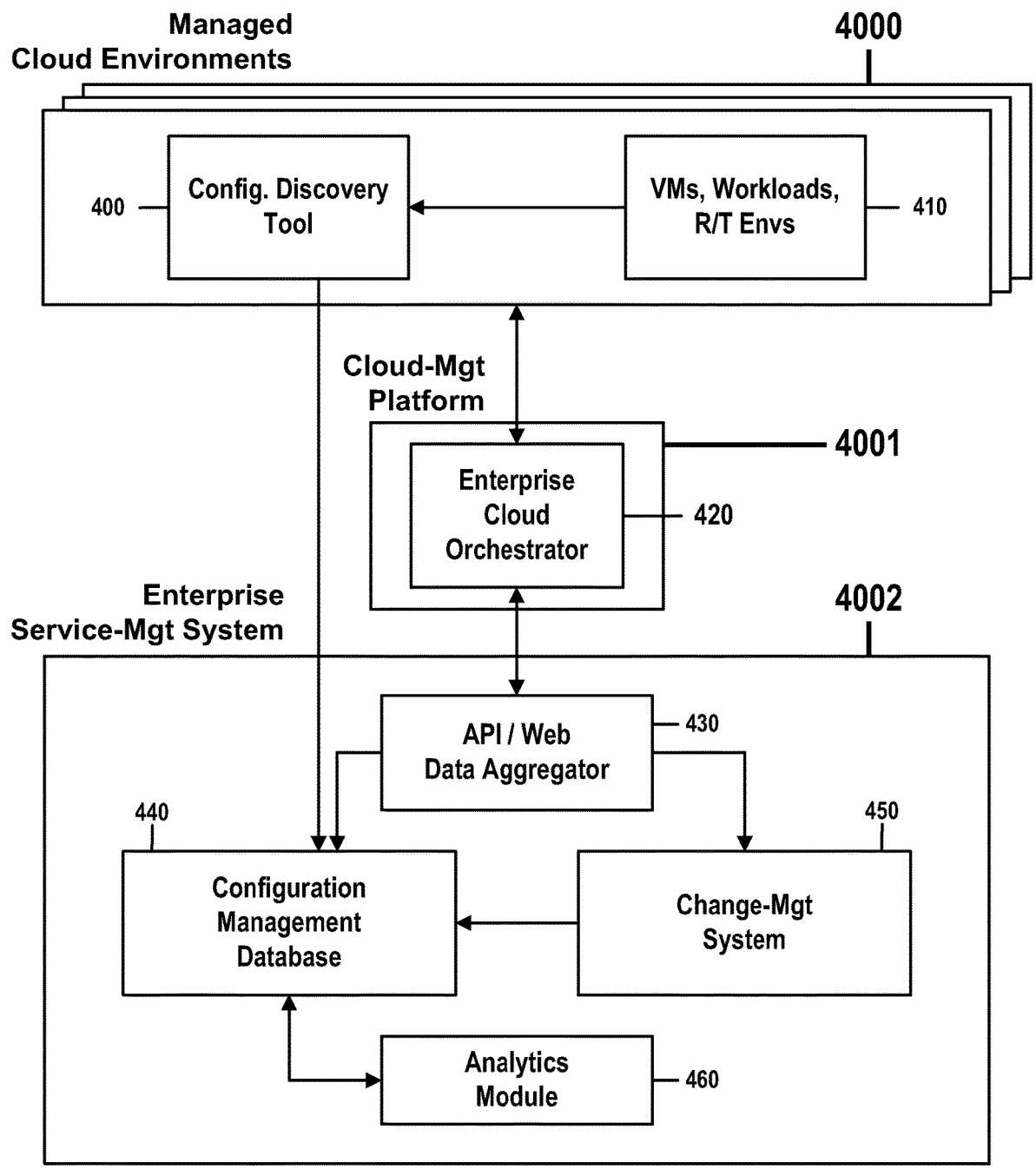
FIG. 4 shows elements of a cloud-computing architecture within which may be implemented embodiments of the present invention shown in FIG. 5.
Figure 5:
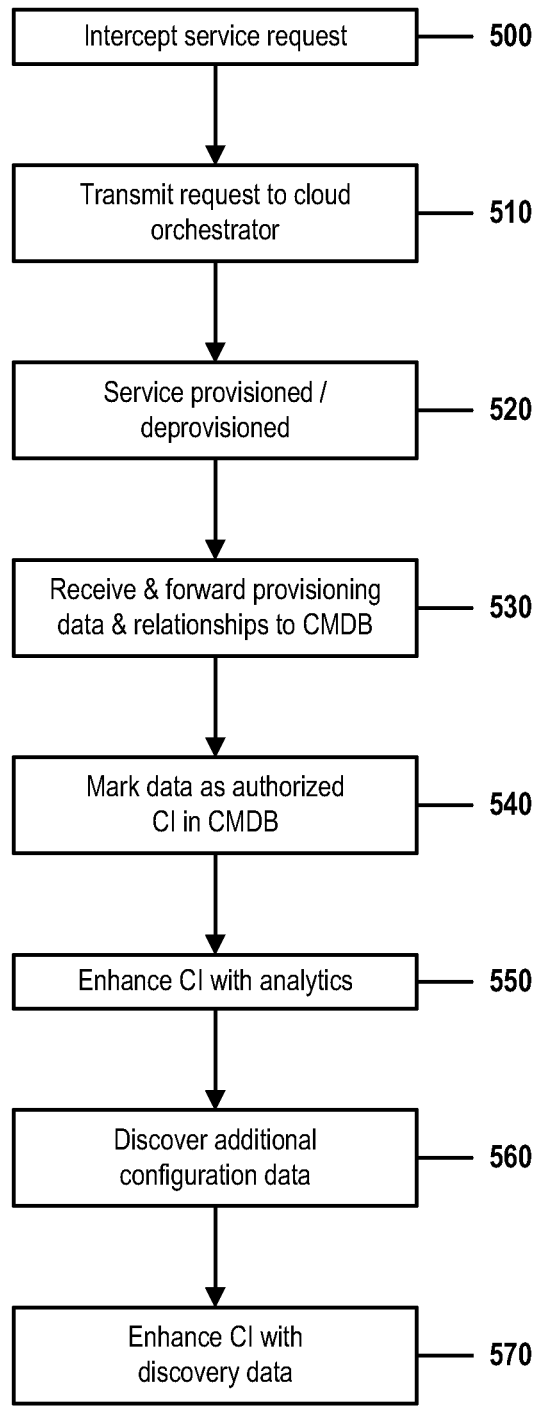
FIG. 5 is a flow chart that illustrates steps of a method for capturing configuration items from hybrid-cloud provisioning data in accordance with embodiments of the present invention.

FIG. 4 shows elements of a cloud-computing architecture within which may be implemented embodiments of the present invention described in FIG. 5. FIG. 4 contains items 400-460 and 4000-4002.

Items 4000-4002 are components of a hybrid cloud-computing platform.

Item 4000 is the cloud platform itself, which may comprise numerous virtualized resources and other configuration items (or "CIs"), such as virtual machines, servers, networks, workloads, software applications, middleware, and runtime environments, as well as components or specific attributes of such entities.

Cloud platform 4000 may also comprise a conventional configuration-discovery tool 400, such as a discovery agent, that traverses one or more clouds 410 of cloud platform 4000 in order to discover details of each provisioned configuration item within a managed cloud environment 410. This discovery tool 400 attempts to identify every potential CI comprised by a cloud 410, discovering unique identifiers and attributes of each CI. In some embodiments, the discovery tool 400 may also determine relationships, such as dependency relationships, between or among CIs.

Cloud-platform 4000 is managed by a cloud-management platform, stack, or other management mechanism 4001 known in the art. One component comprised by this cloud-management platform may be an enterprise cloud-orchestration module 420, which is responsible, among other things, for orchestrating the provisioning and deprovisioning of virtualized cloud resources, including configuration items. In some embodiments, cloud orchestration mechanism 420 may comprise an orchestration database or a service catalog that stores information about characteristics of each virtual resource or service that may be provisioned or deprovisioned.

Item 4002 is an enterprise-wide service-management system (or "SMS"), which controls and manages cloud-based services operating within the cloud-computing platform 4000.

SMS 4002 comprises a configuration management database (or "CMDB") 440, which stores configuration records or other data items identifying attributes of each CI within the managed cloud environments 4000.

A CMDB 440 can be defined broadly as any repository or data warehouse that stores configuration data capable of supporting an information-technology installation. In embodiments and examples described in this document, CMDB 440 stores data associated with IT assets (referred to in this document as "configuration items"), as well as to descriptions of relationships among CI assets. In general, information stored in CMDB 440 allows an information system, such as a change-management system or a cloud's service-management system, to quickly identify authenticated attributes of assets crucial to the hybrid cloud. These attributes may, for example, comprise identifications of a CI's upstream source CIs, dependency relationships with other CIs, or downstream target CIs.

In embodiments of FIG. 4, CMDB 440 may be used by a change-management system 450 to identify attributes of configuration items under control of change-management system 450. As defined here, a change-management system 450 attempts to ensure that infrastructure changes requested in order to manage network infrastructure are handled by standard, efficient procedures. These changes may be identified by service requests to a cloud-orchestration mechanism 420 and may derive from a variety of sources, such as from contractual or technical constraints or requirements, hardware or software upgrades, maintenance procedures, or as indirect results of user requests. When making a change to a known configuration item, allowing a change-management system 450 to use CI information stored in the CMDB 440 to manage the change helps ensure that the change is performed in a predictable, standardized manner. Embodiments of the present invention facilitate this goal by efficiently and accurately populating CMDB 440 with validated CI information.

The cloud-management platform 4001 interfaces to components of the SMS 4002 through a data-aggregator module 430, which may be implemented by any means known in the art. Data aggregation may, for example, be performed by means of standard Application Programming Interface ("API") system calls or by requesting standardized Web services.

Analytics tool, application, or software module 460 is an artificially intelligent module that is based on known methods of analytics. Analytics module 460 may perform analytics-based inferential procedures by any technologies or techniques known in the art of artificial intelligence, such as by means of an inference engine, a knowledgebase, or of concepts and rules organized into an ontology.

In embodiments of the present invention analytics module 460 may analyze CI-attribute data stored in configuration-management database 440 in order to identify more nuanced relationships and attributes of configuration items. This data may have been captured by data-aggregation module 430 from one or more cloud-orchestration mechanisms 420.

For example, in a hybrid cloud that consists of 90% virtualized cloud resources and 10% legacy non-cloud resources, discovery may be required for identifying configuration-item attributes associated with the non-cloud resources. In some cases, that discovered information may need to be validated or consolidated in order to store it in records of a CMDB 440 capable of being used by authorized management systems.

In some embodiments, an implementer may also desire to discover even cloud-based configuration-item attributes in order to increase confidence in CI data captured from cloud-orchestration database by means of a method of the present invention. In such cases, discovery may be limited, at an implementer's discretion, to an initial period of time during which a new embodiment is still being vetted.

FIG. 5 is a flow chart that illustrates steps of a method for capturing configuration items from hybrid-cloud provisioning data in accordance with embodiments of the present invention. FIG. 5 contains steps 500-570.

In step 500, service-management system 4002 captures a service request generated automatically by a managed cloud environment 410 or by a user of a managed cloud environment 410. This service request may have originally been directed to a cloud-orchestration mechanism, such as cloud orchestrator 420, that is responsible for orchestrating and managing responses to service requests, including provisioning and deprovisioning cloud-based virtual resources and services.

This service request comprises a request for a cloud service, such as a virtual machine, a runtime environment, a software application, or a SaaS (Software as a Service), IaaS (Infrastructure as a Service), PaaS (Platform as a Service) offering of a cloud provider selected from the cloud-provider's service catalog. The service request may, for example, request that a virtualized component be provisioned or deprovisioned, or that an instance of a software object or other configuration item be provisioned or deprovisioned.

The service-management system 4002 may in this step identify one or more configuration items that are the subject of this service request. These one or more CIs may comprise any configuration items associated with the requested service, such as a runtime environment, a virtual infrastructure component, a virtual storage object, or an instance of an application. For example, if the service request requests that an instance of a virtualized server be provisioned, system 4002 may in this step determine that the service request identifies one or more configuration objects that will be comprised by that virtualized service.

In step 510, the service-management system 4002 forwards the service request to the cloud-orchestration mechanism, such as the cloud orchestrator 420, through the data-aggregator 420 interface.

In step 520, the cloud-orchestration mechanism 420 performs the requested service. This service may comprise provisioning, deprovisioning, configuring, or performing some other operation upon the one or more configuration items identified in step 500.

In step 530, the service-management system 4002 receives notice through the data-aggregator 420 interface or otherwise determines that the cloud-orchestration mechanism 420 has successfully completed the requested service. If the requested service cannot be successfully completed, the method of FIG. 5 ends because no configuration items will have been created or deleted by the orchestration mechanism 420.

The system 4002 in this step also receives CI information about the configuration item (including the service itself) through the data-aggregator 430 or other interface between the service-management system 4002 and the orchestrator 420 of cloud-management platform 4001. In embodiments of the present invention data-aggregator 430 may use API system calls or Web services in order to filter and format data extracted from a component of cloud-management platform 4001 (such as an enterprise cloud-orchestrator module 420) in order to facilitating storing that data in configuration-management database 440. If properly configured, the data-aggregator 430 may in this way increase efficiency and reliability of an embodiment by facilitating straightforward mapping of data stored in a database of an orchestration mechanism 420 to a data organization of a schema of the CMDB 440.

This received CI information may comprise any attributes of the one or more CIs associated with the service request that are set by the orchestration mechanism 420 and that may be required by the service-management system 4002 in order to manage or control the provisioned service. These attributes might, for example, comprise a unique identifier, such as a network address or hostname, a configuration setting, or a requirement for an external resource. These attributes might also identify relationships among configurations, such as a dependency relationship that specifies that a virtual LAN CI must be provisioned in managed cloud 410 before a server virtual machine can be provisioned in that same cloud 410.

The SMS 4002 in this step then stores the CI-attribute information in the configuration-management database 440, where it may be used by the SMS 4002 to manage and control future services, or to ensure that services are implemented and managed in a structured manner that is consistent with business priorities.

In some embodiments, the received CI-attribute data may be received from an orchestration database managed by the enterprise cloud orchestrator 420. In such cases, SMS 4002 may confirm in this step that the orchestration database and the CMDB 440 store the received CI-attribute data in a manner that allows the two databases to be mapped.

The CI-attribute data may be transferred from cloud-management platform 4001 to the service-management system 4002 through the data aggregator 430 by means of conventional system calls to an Application Programming Interface ("API"). Calls to the common Representational state transfer (REST) API, for example, may be used to extract provisioning data and relations from the database of cloud orchestrator 420 and load into enterprise CMDB.

In other embodiments, the CI-attribute data may be transferred from cloud-management platform 4001 to the service-management system 4002 through the data aggregator 430 by means of existing Web services of an enterprise configuration-management mechanism. In such cases, the configuration-management mechanism may build a Web-service template suitable for provisioning data. This may allow data aggregator interface 430 to retrieve provisioning data and relationship information for the one or more CIs through the Web service, and further allow the system 4002 to load the retrieved data into CMDB 440 in accordance with a built-in template provided by the Web service.

In step 540, SMS 4002 marks the CI-attribute data loaded into CMDB 440 in step 530 as being authorized, despite the fact that a conventional consolidation operation has not been performed on the CI-attribute data. This marking may be performed by any means known in the art, such as by setting a flag or configuring an attribute field of the CMDB 440 that is associated with the stored CI data.

This step is made possible by the assumption that, in a properly implemented cloud, only an authorized user or program can order a provisioning or deprovisioning service through the cloud's service catalog. The CI-attribute data and the CI itself may thus be presumed to be authorized. In such cases, no further consolidation or promotion procedure is required to validate or confirm that the stored CI-attribute data is authorized.

In step 550, analytics module, tool, or application 460 performs an artificially intelligent analytics function upon the newly stored CI-attribute data. In some cases, this analytics module 550 may be based on technologies and techniques known in the field of artificial intelligence or inferential logic, and may incorporate known AI components, such as a knowledgebase or an ontology of concepts and rules.

Embodiments of the present invention are flexible enough to accommodate any known commercially available analytics module 550 or a proprietary analytics module 550 written especially for a particular implementation.

The analytics operation performed by analytics module 550 may be directed toward identifying deeper relationships among configuration items than might be directly identified by the received provisioning data.

In one example analytics module 460 might enhance CI data received from the cloud orchestrator 420 by inferring dependencies and other relationships, configuration constraints, impact upon other CIs, or resource constraints that might affect future provisioning decisions or other service-related issues.

Some embodiments may comprise multiple analytics modules 460, each of which may perform a distinct class of analytics functions or other artificially intelligent inferential tasks.

In step 560, service-management system 4002 may optionally perform a discovery operation, similar to those performed by a bot or an agent of a conventional SMS systems in order to collect CI-attribute data.

Although this discovery mechanism is not needed by embodiments of the present invention, discovering CI-attribute data may be used to enhance, complement, or elaborate data received from orchestration-mechanism 420.

In one example, consider a hybrid cloud in which 90% of its configuration items are virtualized, but the other 10% reside in a legacy non-cloud enterprise-computing environment. In this case, it is not possible to capture attribute data of the non-cloud CIs because nonvirtualized systems, services, resources, and infrastructure are not provisioned by a cloud-orchestration mechanism 420. A discovery mechanism might thus be required to capture and populate CMDB 440 with CI-attribute data for non-cloud CIs.

As with known discovery-based CI-capturing procedures, the CI attribute data captured by a discovery mechanism in this example, might require further processing in order validate the captured non-cloud data.

In some embodiments, using a discovery tool to capture CI-attribute data or change data may be redundant with the rest of the procedure of FIG. 5 or may not be practical or appropriate in virtualized regions of a hybrid cloud. But even in those cases, this optional discovery procedure may be implemented in order to provide additional confidence in the provisioning and relationship data retrieved from the cloud-orchestration mechanism 420 in step 530, or in the CI attributes and relationships inferred in step 550.

For example, it may be possible in some embodiments to run the configuration-discovery tool 400 once a week, storing the discovery-tool 400 output in the CMDB as a weekly bulk transfer. In such a case, provisioning data captured from cloud-orchestration system 420 may be a primary method of capturing CI data, and discovery is used only to enhance or further ensure accuracy of the captured provisioning data. Discovered data may, for example, identify second-order characteristics of a CI that are not required in order to perform a provisioning operation. In other cases, if a discovery tool 400 has been in use for an extended period of time, may have accumulated a large body of CI-attribute information that may be used to augment newly captured provisioning data that has not yet been collected for a long enough period of time to be considered reliable in certain circumstances.

In step 560, the service-management system 4002 adds any newly discovered CI-attribute change data to CMDB 440. This additional stored data may be used by SMS 402 to control and manage change requests or service requests related to CIs in a non-cloud region of the hybrid cloud.

What is claimed is:

1. A service-management system, of a cloud-computing platform, comprising a processor, a memory coupled to the processor, and a computer-readable hardware storage device coupled to the processor, the storage device containing program code configured to be run by the processor via the memory to implement a method for capturing configuration items from cloud provisioning data, the method comprising:

intercepting a service request directed to a cloud-orchestration mechanism of the cloud-computing platform, where the service request requests that the cloud-orchestration mechanism provision or deprovision a virtualized configuration item of the cloud-computing platform;

extracting from the service request an identification of a request to provision a first configuration item of the cloud-computing platform;

forwarding the service request to the cloud-orchestration mechanism;

capturing provisioning information from a cloud-orchestration database the cloud-orchestration mechanism, where the captured provisioning information describes one or more attributes of the first configuration item;

consolidating the captured provisioning information with existing information, stored by the cloud-computing platform, to generate a consolidated information that identifies attributes of the first configuration item;

filtering the consolidated information such that the filtered information is capable of being more efficiently stored in a configuration-management database that stores the consolidated information; and marking the consolidated information as being authorized for use by other management systems of the cloud-computing platform.

2. The system of claim 1, further comprising:
extracting from the service request an identification of a request to deprovision a second configuration item of the cloud-computing platform;
forwarding the service request to the cloud-orchestration mechanism;
determining that the cloud-orchestration mechanism has deprovisioned the second configuration item;
capturing deprovisioning information from the cloud-orchestration mechanism, where the captured deprovisioning information describes one or more attributes of the second configuration item; and
deleting existing information, stored by the cloud-computing platform, that identifies attributes of the second configuration item.

3. The system of claim 1, where the capturing further comprises:
formatting the captured provisioning information into a format that is compatible with a format of the configuration-management database.

4. The system of claim 1, where the existing information and the consolidated information are stored by the cloud-computing platform in a configuration-management database.

5. The system of claim 1, further comprising:
identifying, through a discovery software module, one or more attributes of a third configuration item of the cloud-computing platform; and
storing the one or more attributes of the third configuration item in a configuration-management database that stores the consolidated information.

6. The system of claim 1, further comprising:
enhancing the captured provisioning data by submitting it to an artificially intelligent analytics application capable of inferring additional characteristics of the first configuration item from the captured provisioning data.

7. The system of claim 5, where the enhancing comprises identifying a dependency relationship between the first configuration item and another configuration item of the cloud-computing platform.

8. A method for capturing configuration items from cloud provisioning data, the method comprising:
intercepting a service request directed to a cloud-orchestration mechanism of the cloud-computing platform, where the service request requests that the cloud-orchestration mechanism provision or deprovision a virtualized configuration item of the cloud-computing platform;
extracting from the service request an identification of a request to provision a first configuration item of the cloud-computing platform;
forwarding the service request to the cloud-orchestration mechanism;
capturing provisioning information from the cloud-orchestration mechanism, where the captured provisioning information describes one or more attributes of the first configuration item;
consolidating the captured provisioning information with existing information, stored by the cloud-computing platform, to generate a consolidated information that identifies attributes of the first configuration item;
filtering the consolidated information such that the filtered information is capable of being more efficiently stored in a configuration-management database that stores the consolidated information; and
marking the consolidated information as being authorized for use by other management systems of the cloud-computing platform.

9. The method of claim 8, further comprising:
extracting from the service request an identification of a request to deprovision a second configuration item of the cloud-computing platform;
forwarding the service request to the cloud-orchestration mechanism;
determining that the cloud-orchestration mechanism has deprovisioned the second configuration item;
capturing deprovisioning information from the cloud-orchestration mechanism, where the captured deprovisioning information describes one or more attributes of the second configuration item; and
deleting existing information, stored by the cloud-computing platform, that identifies attributes of the second configuration item.

10. The method of claim 8, where the capturing further comprises:
formatting the captured provisioning information into a format that is compatible with a format of the configuration-management database.

11. The method of claim 8, further comprising:
identifying, through a discovery software module, one or more attributes of a third configuration item of the cloud-computing platform; and
storing the one or more attributes of the third configuration item in a configuration-management database that stores the consolidated information.

12. The method of claim 8, further comprising:
enhancing the captured provisioning data by submitting it to an artificially intelligent analytics application capable of inferring additional characteristics of the first configuration item from the captured provisioning data.

13. The method of claim 12, where the enhancing comprises identifying a dependency relationship between the first configuration item and another configuration item of the cloud-computing platform.

14. The method of claim 8, further comprising providing at least one support service for at least one of creating, integrating, hosting, maintaining, and deploying computer-readable program code in the computer system, wherein the computer-readable program code in combination with the computer system is configured to implement the intercepting, the extracting, the forwarding, the capturing, the consolidating, the filtering, and the marking.

15. A computer program product, comprising a computer-readable hardware storage device having a computer-readable program code stored therein, the program code configured to be executed by a service-management system comprising a processor, a memory coupled to the processor, and a computer-readable hardware storage device coupled to the processor, the storage device containing program code configured to be run by the processor via the memory to implement a method for capturing configuration items from cloud provisioning data, the method comprising:
intercepting a service request directed to a cloud-orchestration mechanism of the cloud-computing platform, where the service request requests that the cloud-orchestration mechanism provision or deprovision a virtualized configuration item of the cloud-computing platform;
extracting from the service request an identification of a request to provision a first configuration item of the cloud-computing platform;

forwarding the service request to the cloud-orchestration mechanism;

capturing provisioning information from the cloud-orchestration mechanism, where the captured provisioning information describes one or more attributes of the first configuration item;

consolidating the captured provisioning information with existing information, stored by the cloud-computing platform, to generate a consolidated information that identifies attributes of the first configuration item;

filtering the consolidated information such that the filtered information is capable of being more efficiently stored in a configuration-management database that stores the consolidated information; and marking the consolidated information as being authorized for use by other management systems of the cloud-computing platform.

16. The computer program product of claim 15, further comprising:

extracting from the service request an identification of a request to deprovision a second configuration item of the cloud-computing platform;

forwarding the service request to the cloud-orchestration mechanism;

determining that the cloud-orchestration mechanism has deprovisioned the second configuration item;

capturing deprovisioning information from the cloud-orchestration mechanism, where the captured deprovisioning information describes one or more attributes of the second configuration item; and deleting existing information, stored by the cloud-computing platform, that identifies attributes of the second configuration item.

17. The computer program product of claim 15, where the capturing further comprises:

formatting the captured provisioning information into a format that is compatible with a format of the configuration-management database.

18. The computer program product of claim 15, further comprising:

identifying, through a discovery software module, one or more attributes of a third configuration item of the cloud-computing platform; and storing the one or more attributes of the third configuration item in a configuration-management database that stores the consolidated information.

19. The computer program product of claim 15, further comprising:

enhancing the captured provisioning data by submitting it to an artificially intelligent analytics application capable of inferring additional characteristics of the first configuration item from the captured provisioning data.

20. The computer program product of claim 19, where the enhancing comprises identifying a dependency relationship between the first configuration item and another configuration item of the cloud-computing platform.

* * * * *